(No Model.)

W. S. BRELSFOARD.
WHEEL.

No. 514,409. Patented Feb. 6, 1894.

WITNESSES.
E. J. Schroder.
L. W. Mitchell.

INVENTOR
William S. Brelsfoard
By Robert S. Carr,
ATTORNEY.

THE NATIONAL LITHOGRAPHING COMPANY,
WASHINGTON, D. C.

UNITED STATES PATENT OFFICE.

WILLIAM S. BRELSFOARD, OF JACKSONBOROUGH, ASSIGNOR OF ONE-HALF TO JOSEPH H. WEBSTER AND THOMAS DOWREY, OF HAMILTON, OHIO.

WHEEL.

SPECIFICATION forming part of Letters Patent No. 514,409, dated February 6, 1894.

Application filed November 13, 1893. Serial No. 490,740. (No model.)

*To all whom it may concern:*

Be it known that I, WILLIAM S. BRELSFOARD, of Jacksonborough, Butler county, Ohio, have invented certain new and useful Improvements in Wheels, of which the following is a specification.

My invention relates to that class known as suspension wheels, wherein the hub is supported concentric to the rim by the tension of the spokes; and the object of my improvement is to provide a limited yielding of the hub within the rim to relieve the vehicle from the violence of sudden shocks incident to travel over uneven surfaces; to provide a driver for the rim, auxiliary to the spokes; and to provide a hub of special construction. These objects are attained in the following described manner as illustrated in the accompanying drawings, in which—

Figure 1:
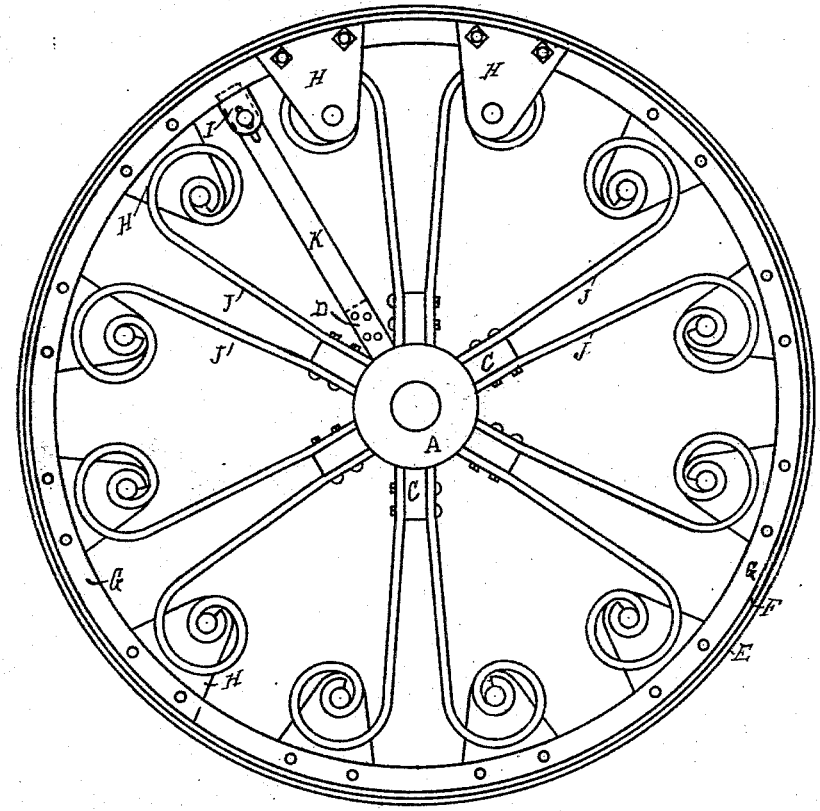
Figure 2:
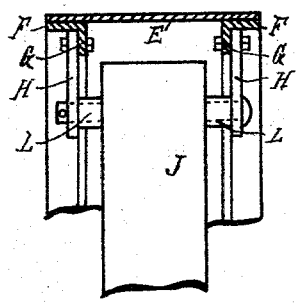
Figure 3:
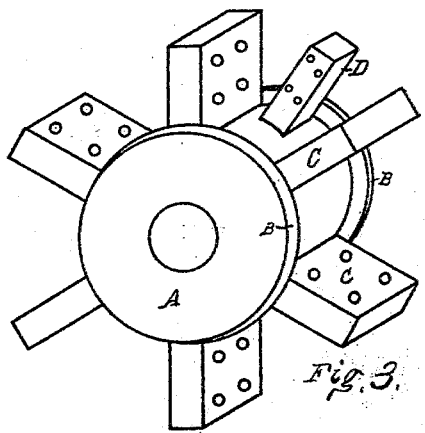

Figure 1— shows an end elevation of the wheel; Fig. 2— a transverse section of the rim; Fig. 3— a perspective view of the hub.

In the drawings, A represents the hub, B annular end collars integral thereon, C arms radiating from the hub and between the collars, D a lug projecting from near one end of the hub in a radial line between contiguous arms said lug and the arms each being provided with bolt holes and being formed integral with the hub.

The rim or periphery of the wheel consists of tire E secured by its edges on rings F. Said rings are preferably formed of angle iron with one leg thereof projecting toward the hub to form annular flanges G within the edges of the tire.

Plates H, each provided with a bolt hole, are secured to the flanges. The plates on one flange are directly opposite to those on the other. The opposite plates form pairs, and said pairs are double in number to the arms on the hub. Bosses I are secured within the rim at a point between contiguous pairs of plates and in a radial line with lug D on the hub.

Spokes J are each formed of a thin strip of spring steel or other suitable resilient metal. They are substantially straight, with one end terminating in the form of a spiral or volute. The other end is bolted to the sides of the arms on the hubs, two spokes being secured to each arm from which they slightly diverge toward the rim with the spirals turned from each other. The spokes are secured to the rim by bolts that engage the spirals with the corresponding pairs of plates.

Driver K is inflexible and rigidly bolted at one end to the lug D on the hub. The other end is provided with a slot through which a bolt movably engages it with the bosses on the rim.

Thimbles L on the bolts keep the spokes properly between the plates.

The width of the spokes prevents the rim from being deflected out of the plane of the wheel. The tensile strength of the spokes together with the resilience of the volutes retain the hub normally concentric to the rim. The weight carried by the wheel however is principally sustained by the spokes that are above the hub. The flexibility of the volute portion of the spokes serves to dissipate the violence of shocks occurring to the rim and protects the hub from their effects. Wheels of this construction are well suited for drive wheels on traction engines. When so used it is well to attach the inflexible driver K as an auxiliary to the spokes to positively turn the rim with the hub.

In the construction of the hub with the arms integral therewith, it is found to be difficult to bore bolt holes in the arms necessary for the attachment of the spokes thereto.

By first making the arms of cast or wrought iron separately and providing them with the desired bolt holes through one end and afterward casting the hub on the opposite end of the arms, makes them substantially integral with the hub and avoids the difficulty of boring them in their position on the hub.

Having fully described my improvements, what I claim as my invention, and desire to secure by Letters Patent, is—

1. A wheel consisting of a rim, a hub, and a series of spokes, said spokes engaging the rim with the hub, and being secured to the hub in pairs that terminate at the rim in form of volutes turned in opposite directions.

2. A wheel consisting of a rim, a hub, a series of spokes, and a driver, said driver being rigidly secured at one end to the hub and movably engaging at the opposite end with the rim, said spokes being secured in pairs to the hub, and the spokes of each pair terminating at the rim in form of spirals turned in opposite directions respectively.

3. A wheel consisting of a rim, provided with a series of plates projecting inwardly from its edges and opposite to each other. A hub provided with a series of arms radiating therefrom. A series of spokes secured in pairs to the respective arms and on opposite sides thereof, said spokes diverging from the arms in straight lines toward the rim and terminating in opposite directions in form of spirals, or volutes, and bolts securing the extremity of the spokes that terminate within the spirals to respective pairs of plates on the rim.

4. In a wheel the herein described method of constructing the hub which consists in forming the spoke arms separately and providing them at one end with bolt holes for the attachment of the spokes thereto, then casting the hub integral with the opposite end of the arms.

WILLIAM S. BRELSFOARD.

Witnesses:
C. W. MITCHELL,
ROBERT S. CARR.